(12) United States Patent
Kim et al.

(10) Patent No.: US 10,396,384 B2
(45) Date of Patent: Aug. 27, 2019

(54) COMPOSITE POLYMER ELECTROLYTE MEMBRANE FOR FUEL CELL, AND METHOD OF MANUFACTURING THE SAME

(71) Applicant: KOREA INSTITUTE OF SCIENCE AND TECHNOLOGY, Seoul (KR)

(72) Inventors: Jin Young Kim, Seoul (KR); Sunhee Jo, Seoul (KR); So Young Lee, Seoul (KR); Sung Jong Yoo, Seoul (KR); Jong Hyun Jang, Seoul (KR); Hyoung-Juhn Kim, Seoul (KR); Jonghee Han, Seoul (KR); Suk Woo Nam, Seoul (KR); Tae Hoon Lim, Seoul (KR)

(73) Assignee: KOREA INSTITUTE OF SCIENCE AND TECHNOLOGY, Seongbuk-Gu, Seoul (KR)

( * ) Notice: Subject to any disclaimer, the term of this patent is extended or adjusted under 35 U.S.C. 154(b) by 96 days.

(21) Appl. No.: 15/719,557

(22) Filed: Sep. 29, 2017

(65) Prior Publication Data

US 2018/0102562 A1    Apr. 12, 2018

(30) Foreign Application Priority Data

Oct. 12, 2016    (KR) .................. 10-2016-0132215

(51) Int. Cl.
*H01M 8/106* (2016.01)
*H01M 8/1039* (2016.01)
(Continued)

(52) U.S. Cl.
CPC ......... *H01M 8/106* (2013.01); *H01M 8/1039* (2013.01); *H01M 8/1053* (2013.01);
(Continued)

(58) Field of Classification Search
CPC ....... H01M 2008/1095; H01M 8/1039; H01M 8/1069; H01M 8/1053; H01M 8/106
See application file for complete search history.

(56) References Cited

U.S. PATENT DOCUMENTS

| 5,547,551 A | 8/1996 | Bahar et al. |
| 6,156,451 A | 12/2000 | Banerjee et al. |
| 2015/0340703 A1 | 11/2015 | Fujii et al. |

FOREIGN PATENT DOCUMENTS

| JP | 2005216769 A | 8/2005 |
| JP | 201496299 A | 5/2014 |

(Continued)

OTHER PUBLICATIONS

"Nafion/PTFE composite membranes for fuel cell applications" published by Yu et al. in Journal of Polymer Research 11: 217-224, 2004.*
(Continued)

*Primary Examiner* — Basia A Ridley
*Assistant Examiner* — Heng M. Chan
(74) *Attorney, Agent, or Firm* — Cantor Colburn LLP

(57) ABSTRACT

Provided is a composite polymer electrolyte membrane for a fuel cell, including: a porous fluorinated polymer support; and a perfluorinated sulfonic acid polymer resin membrane which fills the inside of pores of the porous fluorinated polymer support and covers an external surface of the porous fluorinated polymer support.

3 Claims, 13 Drawing Sheets

(51) Int. Cl.
*H01M 8/1069* (2016.01)
*H01M 8/1053* (2016.01)
*H01M 8/1018* (2016.01)

(52) U.S. Cl.
CPC .. *H01M 8/1069* (2013.01); *H01M 2008/1095* (2013.01); *Y02P 70/56* (2015.11)

(56) References Cited

FOREIGN PATENT DOCUMENTS

| | | | |
|---|---|---|---|
| JP | 2016149329 A | 8/2016 | |
| KR | 1020060083372 A | 7/2006 | |
| KR | 1020140034544 A | 3/2014 | |
| KR | 1020150135116 A | 12/2015 | |
| WO | 2011078465 A2 | 6/2011 | |

OTHER PUBLICATIONS

Libin Yang et al., "A new method to prepare high performance perfluorinated sulfonic acid ionomer/porous expanded polytetrafluoroethylene composite membranes based on perfluorinated sulfonyl fluoride polymer solution", Journal of Power Sources, Jun. 18, 2013, pp. 392-395, vol. 243, Elsevier B.V.

\* cited by examiner

COMPOSITE POLYMER ELECTROLYTE MEMBRANE FOR FUEL CELL, AND METHOD OF MANUFACTURING THE SAME

CROSS-REFERENCE TO RELATED APPLICATION

This application claims the priority of Korean Patent Application No. 10-2016-0132215, filed on Oct. 12, 2016, and all the benefits accruing therefrom under 35 U.S.C. § 119, the contents of which in its entirety are herein incorporated by reference.

BACKGROUND

1. Field

The present disclosure relates to a composite polymer electrolyte membrane for a fuel cell, and a method of manufacturing the same. More specifically, the present disclosure relates to a composite polymer electrolyte membrane for a polymer electrolyte membrane fuel cell (PEMFC), and a method of manufacturing the same.

[Description of the National Support Research and Development]

This study was conducted with the support from the Ministry of Trade, Industry and Energy, Republic of Korea under the supervision of the Korea Institute of Energy Technology Evaluation and Planning, the project title is the Development of New and Renewable Energy Core Technology, and the project name is the Localization of Perfluorinated Sulfonic Acid Ionomer-PTFE Reinforced Membrane for Automotive Fuel Cells (Project Identification No.: 1415146776).

In addition, this study was conducted with the support from the Ministry of Trade, Industry and Energy, Republic of Korea under the supervision of the Korea Institute of Energy Technology Evaluation and Planning, the project title is the Development of New and Renewable Energy Core Technology, and the project name is Development source technology of non-platinum catalyst source for fuel cell fuel price reduction (Project Identification No.: 20133010011320).

2. Description of the Related Art

A polymer electrolyte membrane fuel cell (PEMFC) is a type of fuel cell which has been highlighted as a next-generation energy source, and is a fuel cell which uses a polymer membrane having a hydrogen ion exchange characteristic as an electrolyte. The polymer electrolyte membrane fuel cell (PEMFC) is required to include a polymer electrolyte membrane having not only electrical insulating properties, but also characteristics such as high hydrogen ionic conductivity, low gas permeability, and high mechanical strength and dimensional stability in order to improve an initial performance and secure a long-term performance.

However, since an increase in thickness of a polymer electrolyte membrane for implementing high mechanical strength also increases the resistance of the corresponding membrane, an increase in resistance may result in low ionic conductivity of the corresponding membrane. That is, it may be considerably difficult to implement a polymer electrolyte membrane having high durability while making the membrane thin, such that the membrane has high ionic conductivity. Further, a considerable amount of water may be absorbed within a hydrophilic domain of the corresponding polymer electrolyte membrane when a fuel cell is driven, so that the ionic conductivity, mechanical strength, and gas barrier characteristics of the polymer electrolyte membrane may significantly deteriorate, and the dimensional stability may also be significantly reduced by a length expansion occurring while the membrane is hydrated. Therefore, when a fuel cell is driven, interests in a polymer electrolyte membrane which maintains excellent physical properties without being easily decomposed due to electrochemical stress such as hydrolysis and oxidation-reduction reaction have been increased.

Meanwhile, due to the excellent performance, a perfluorinated polymer electrolyte membrane such as a Nafion single membrane manufactured by Dupont Inc. has been currently commercialized and most widely used. However, since the perfluorinated polymer electrolyte membrane has a high unit cost and low mechanical and morphological stability in spite of excellent chemical resistance, oxidation resistance, and ionic conductivity, there is a gradually increasing need for a new polymer electrolyte membrane which is economically efficient while having the excellent characteristics as described above.

REFERENCES OF THE RELATED ART

Patent Documents

U.S. Pat. No. 5,547,551
U.S. Pat. No. 6,156,451

SUMMARY

In an aspect, the present disclosure is directed to providing a composite polymer electrolyte membrane for a fuel cell, which has an improved hydrogen ion exchange characteristic and low gas permeability, has excellent mechanical strength as compared to the thickness, and is economically efficient and easily manufactured, and a method of manufacturing the same.

In an aspect, the present disclosure provides a composite polymer electrolyte membrane for a fuel cell, including: a porous fluorinated polymer support; and a perfluorinated sulfonic acid polymer resin membrane which fills the inside of pores of the porous fluorinated polymer support and covers an external surface of the porous fluorinated polymer support.

In an exemplary embodiment, the composite polymer electrolyte membrane may have a thickness of about 0.1 um or more and less than about 25 um.

In another exemplary embodiment, the porous fluorinated polymer support may include polytetrafluoroethylene, and may be treated with acetone, methanol, ethanol, propanol, or hydrogen peroxide.

In another exemplary embodiment, the perfolurinated sulfonic acid polymer resin membrane may include a perfluorinated sulfonic acid ionomer (PFSA). The perfluorinated sulfonic acid ionomer and the porous fluorinated polymer support may be bonded to each other and composited.

In another exemplary embodiment, the composite polymer electrolyte membrane may not have void therein.

In another exemplary embodiment, the composite polymer electrolyte membrane may constitute a membrane electrode assembly (MEA) of a polymer electrolyte membrane fuel cell (PEMFC).

In another aspect, the present disclosure provides a method of manufacturing a composite polymer electrolyte membrane for a fuel cell, the method including: performing a centrifugal process on a perfluorinated sulfonic acid polymer solution in which a porous fluorinated polymer support is immersed to fill the inside of pores of the porous fluorinated polymer support with a perfluorinated sulfonic acid polymer and form a perfluorinated sulfonic acid polymer membrane on an external surface of the porous fluorinated polymer support.

In an exemplary embodiment, the centrifugal process may be performed at about 300 rpm to about 100,000 rpm for about 5 min to about 60 min.

In another exemplary embodiment, before performing the centrifugal process, the porous fluorinated polymer support may be treated with acetone, methanol, ethanol, propanol, or hydrogen peroxide.

A composite polymer electrolyte membrane according to the present disclosure may exhibit excellent durability and performance as compared to the thickness by having a uniform composition and a high membrane density without any void therein. Specifically, the composite polymer electrolyte membrane may have a hydrogen ion exchange characteristic, mechanical strength, and dimensional stability, which are equal to or better than those of an existing polymer electrolyte membrane for a fuel cell, and may have a gas permeability, which is more improved than that of the existing polymer electrolyte membrane for a fuel cell.

Further, the composite polymer electrolyte membrane is manufactured by an acetone treatment process and a centrifugal process, thereby being manufactured by minimized processes and manufacturing costs. That is, since it is possible to lower a manufacturing unit cost generated by using a complex process and/or a large amount of expensive raw materials (perfluorinated sulfonic acid polymer such as Nafion), it is possible to easily manufacture the composite polymer electrolyte membrane and have an additional advantage in terms of price competitiveness.

Therefore, it is possible easily implement a membrane electrode assembly having excellent performance through the composite polymer electrolyte membrane for a fuel cell as described above, and a fuel cell including the same.

BRIEF DESCRIPTION OF THE DRAWINGS

FIGS. 3 and 4 are SEM photographs showing a surface and a cross-section of a composite polymer electrolyte membrane manufactured according to the Example. Specifically.

FIG. 7 shows results in which linear sweep voltammetry (LSV) and cyclic voltammetry (CV) are performed on the single cell including the composite polymer electrolyte membrane manufactured according to the Example and the single cells including the pure polymer electrolyte membrane manufactured according to Comparative Examples 1 and 2. Specifically.

DETAILED DESCRIPTION

Hereinafter, preferred embodiments of the present disclosure will be described in detail with reference to the accompanying drawings.

The Examples of the present disclosure disclosed herein are exemplified for the purpose of describing the Examples of the present disclosure only, and the Examples of the present disclosure may be carried out in various forms and should not be construed to limit the Examples described herein.

Since the present disclosure may have various changes and different forms, it should be understood that the Examples are not intended to limit the present disclosure to specific disclosure forms and they include all the changes, equivalents and replacements included in the spirit and technical scope of the present disclosure.

In the present specification, being composited or occurrence of composition means that two or more materials are combined so as to have a more effective function while forming phases which are physically or chemically different from each other.

In the present specification, a $H_2$ crossover means a hydrogen permeation phenomenon occurring when unreacted hydrogen in an anode electrode passes through a polymer electrolyte membrane, and then comes to a cathode electrode. The $H_2$ crossover phenomenon, that is, an undesirable diffusion of gas from the anode electrode to the cathode electrode is known to be mainly responsible for degradation of a perfluorinated electrolyte membrane, and in general, the smaller the thickness of the corresponding electrolyte membrane is, the more easily the phenomenon may occur. In the present disclosure, the current of the corresponding cell was measured in an interval of 0.05 V to 0.6 V (vs. the anode) by using linear sweep voltammetry (LSV) while supplying the anode electrode and the cathode electrode with hydrogen and nitrogen, respectively, in order to compare the degree of an occurrence of the $H_2$ crossover phenomenon.

Composite Polymer Electrolyte Membrane for Fuel Cell

Figure 2:
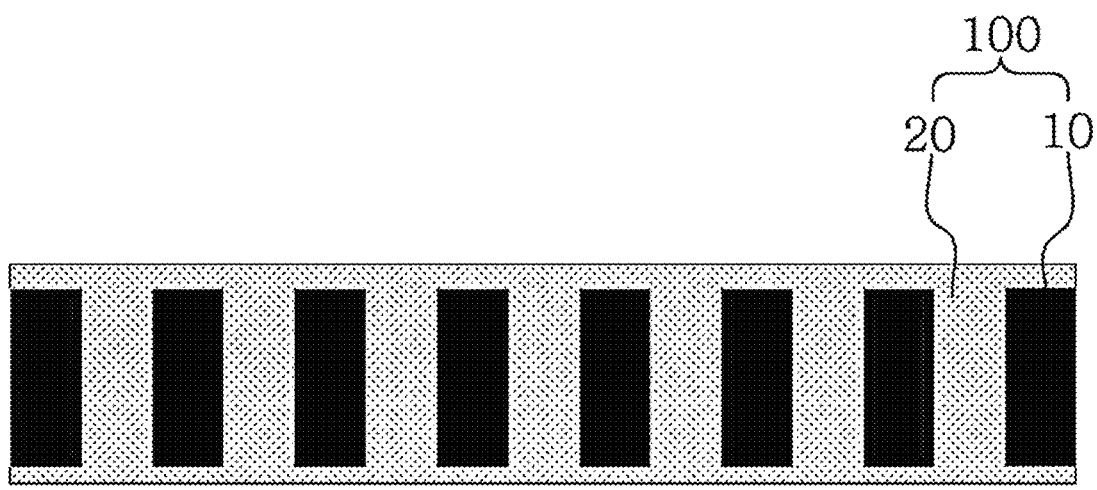
FIG. 2 is a cross-sectional view showing a cross-section of a composite polymer electrolyte membrane according to exemplary embodiments of the present disclosure.

A composite polymer electrolyte membrane of the present disclosure is an electrolyte membrane for a fuel cell, and specifically, the composite polymer electrolyte membrane is an electrolyte membrane which may constitute a membrane electrode assembly (MEA) of a polymer electrolyte membrane fuel cell (PEMFC). The composite polymer electrolyte membrane may have a cross-section with a structure as shown in FIG. 2. Referring to FIG. 2, a composite polymer electrolyte membrane 100 includes: a porous fluorinated polymer support 10; and a perfluorinatd sulfonic acid polymer membrane 20 which fills the inside of pores of the porous fluorinated polymer support 10 and covers an external surface of the porous fluorinated polymer support 10, and does not substantially have void therein.

Figure 1:
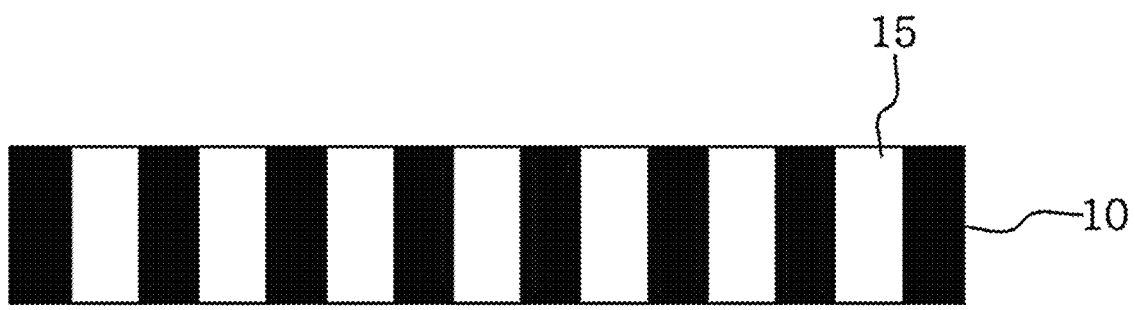
FIG. 1 is a cross-sectional view showing a cross-section of a porous fluorinated polymer support according to exemplary embodiments of the present disclosure.

The porous fluorinated polymer support 10 is a fluorinated polymer support having a plurality of pores 15 therein as shown in FIG. 1, and the porous fluorinated polymer support 10 is chemically stable due to a strong bonding strength between carbon and fluorine and a screening effect which is a characteristic of a fluorine atom, and has an excellent mechanical property and excellent hydrogen ionic conductivity.

In an exemplary embodiment, the porous fluorinated polymer support 10 may include polytetrafluoroethylene, and may be treated particularly with acetone, methanol, ethanol, propanol, or hydrogen peroxide. When the porous fluorinated polymer support 10 includes polytetrafluoroethylene, which is hydrophobic, the porous fluorinated polymer support 10 exhibits more affinity for the air than the perfluorinated sulfonic acid polymer, and thus has low wettability, so that it may be difficult to implement a composite polymer electrolyte membrane having no voids due to the low wettability. However, the porous fluorinated polymer support 10 may have improved wettability by being treated with acetone, methanol, ethanol, propanol, or hydrogen peroxide, and furthermore, may not include any impurities in the inside and/or on the surface thereof.

The porous fluorinated polymer support 10 has improved wettability, and as a result, the perfluorinated sulfonic acid polymer resin membrane 20 may substantially completely fill the inside of pores 15 of the porous fluorinated polymer support 10 and may sufficiently cover an external surface of the porous fluorinated polymer support 10, as shown in FIG. 2. Accordingly, substantially no voids may be present in the inside of a composite polymer electrolyte membrane 100. As a result, the composite polymer electrolyte membrane 100 may have a high membrane density, and accordingly, may have an improved mechanical strength. Further, since the interval between hydrophilic ion domains in the inside of the composite polymer electrolyte membrane 100 is narrowed, the composite polymer electrolyte membrane 100 may have enhanced ionic conductivity and dimensional stability.

The perfluorinated sulfonic acid polymer resin membrane 20 may include a perfluorinated sulfonic acid ionomer (PFSA), for example, a Nafion ionomer. At this time, the perfluorinated sulfonic acid ionomer and the porous fluorinated polymer support 10 are strongly bonded to each other, and thus may be composited.

The composite polymer electrolyte membrane 100 may have a thickness of, for example, about 0.1 um or more and less than about 25 um. The existing polymer electrolyte membranes for a fuel cell, for example, polymer electrolyte membranes composed of a pure perfluorinated sulfonic acid polymer such as a Nafion electrolyte membrane generally have a large thickness of about 25 um to about 50 um for a reinforced mechanical characteristic. However, since an increase in thickness of an electrolyte membrane increases not only a mechanical characteristic, but also the resistance of the membrane, the ionic conductivity of the electrolyte membrane may be lowered in proportion as the electrolyte membrane has a large thickness. In contrast, since the composite polymer electrolyte membrane 100 of the present disclosure has a high membrane density and a high mechanical characteristic as described above, the composite polymer electrolyte membrane 100 of the present disclosure may have an ionic conductivity and a mechanical characteristic, which are substantially equal to or higher than those of the existing polymer electrolyte membranes for a fuel cell, even though the composite polymer electrolyte membrane 100 of the present disclosure has a thickness of, for example, less than about 25 um, specifically, a very small thickness of about 0.1 um or more and less than about 25 um. That is, the composite polymer electrolyte membrane 100 may simultaneously have an excellent hydrogen ion exchange characteristic and an excellent mechanical strength as compared to the thickness.

As described above, the composite polymer electrolyte membrane of the present disclosure has an improved hydrogen ion exchange characteristic and low gas permeability, and has excellent mechanical strength as compared to the thickness. Further, the composite polymer electrolyte membrane has the excellent characteristic as described above while including a pure perfluorinated sulfonic acid polymer with a high unit cost (for example, Nafion) in a relatively small amount, and thus may have an additional advantage in terms of price competitiveness.

Accordingly, it is possible to easily implement a membrane electrode assembly having excellent performance and a fuel cell including the same through the price competitiveness. In particular, since the composite polymer electrolyte membrane has high mechanical strength, a fuel cell stack may be easily manufactured without any damage to the electrolyte membrane through the high mechanical strength.

Method of Manufacturing Composite Polymer Electrolyte Membrane for Fuel Cell

The composite polymer electrolyte membrane of the present disclosure may be manufactured by performing the following processes.

A porous fluorinated polymer support is treated with acetone, methanol, ethanol, propanol, or hydrogen peroxide.

In an exemplary embodiment, the porous fluorinated polymer support may be immersed in acetone, methanol, ethanol, propanol, or hydrogen peroxide at room temperature for several min. Through the immersion, the porous fluorinated polymer support may have improved wettability, and impurities may be removed from the inside and/or surface thereof. The porous fluorinated polymer support may be the same as that described above.

The porous fluorinated polymer support treated with acetone, methanol, ethanol, propanol, or hydrogen peroxide is immersed in a perfluorinated sulfonic acid polymer solution (electrolyte), and then a centrifugal process is performed. At this time, the centrifugal process may be performed, for example, at about 300 rpm to about 100,000 rpm for about 5 min to about 60 min, so as to finally implement a thickness of less than about 25 um by substantially completely filling the inside of pores of the porous fluorinated polymer support without damaging the porous fluorinated polymer support. Accordingly, the inside of pores of the porous fluorinated polymer support is filled with a perfluorinated sulfonic acid polymer solution (electrolyte), and a perfluorinated sulfonic acid polymer resin membrane is formed on an external surface of the porous fluorinated polymer support, so that composition may occur between the porous fluorinated polymer support and the perfluorinated sulfonic acid polymer.

In the manufacture of an existing polymer electrolyte membrane for a fuel cell, it may be considerably difficult to fill the inside of pores of a porous polymer support, particularly, a porous polymer support including a fluorinated polymer such as polytetrafluoroethylene, which is hydrophobic, as described above with only a polymer electrolyte without the air through a typical coating process or dipping process. Accordingly, when an existing polymer electrolyte membrane for a fuel cell, particularly, a composite polymer electrolyte membrane is manufactured, after the coating process or dipping process, it is possible to require a complex manufacturing process, such as essentially accompanying an additional hot pressing process.

However, since the present disclosure may improve wettability by treating the porous fluorinated polymer support with acetone, methanol, ethanol, propanol, or hydrogen peroxide, and uses the centrifugal process as described above, a perfluorinated sulfonic acid polymer solution (electrolyte) may be densely impregnated so as to substantially completely fill the inside of pores of the porous fluorinate polymer support by performing, for example, the centrifugal process only once without performing a separate hot pressing process. That is, in an exemplary embodiment, it is possible to form a perfluorinated sulfonic acid polymer resin membrane, which is the same as that described above and covers an external surface of the porous fluorinated polymer support while filling the inside of pores of the porous fluorinated polymer support. Therefore, the composite polymer electrolyte membrane of the present disclosure may be manufactured so as to have both a high mechanical strength and an excellent performance while having a thickness of, for example, less than about 25 um, specifically, a very small thickness of about 0.1 um or more and less than about 25 um.

Thereafter, the composite polymer electrolyte membrane may be completely manufactured by sufficiently drying the porous fluorinated polymer support in which a perfluorinated sulfonic acid solution is uniformly impregnated.

As described above, it is possible to easily manufacture a composite polymer electrolyte membrane for a fuel cell, which has excellent characteristics such as an improved hydrogen ion exchange characteristic, low gas permeability, and a high mechanical strength as compared to the thickness, and has a uniform composition and structure having substantially no voids, with a minimized process and/or minimized costs by performing a wettability improving treatment process and a centrifugal process.

Meanwhile, a composite polymer electrolyte membrane for a fuel cell and a method of manufacturing the same have been described up until now, but it will be apparent to a person with ordinary skill in the art that a membrane electrode assembly composed of the composite polymer electrolyte membrane as described above, all the fuel cells including the same, for example, a polymer electrolyte fuel cell (PEMFC) also fall within the scope of the present disclosure.

The present disclosure will be described in more detail through the following Examples. However, the Examples are provided for exemplifying the present disclosure, and the scope of the present disclosure is not limited thereto.

EXAMPLE

A porous polytetrafluoroethylene membrane having a thickness of 10 um was fixed on a glass substrate, and then impurities were removed and wettability was improved by immersing the glass substrate in acetone at room temperature for 20 min.

After the glass substrate on which the porous polytetrafluoroethylene membrane treated with acetone was placed was fixed in a falcon tube, a Nafion ionomer solution (EW1100 5 wt %, manufactured by Dupont Inc.) was poured into the falcon tube, and the falcon tube was centrifuged at 8,000 rpm for 90 min. Accordingly, a thin resin membrane, which filled the inside of pores of the porous polytetrafluoroethylene membrane and covered the external surface thereof, was formed. The porous polytetrafluoroethylene membrane, in which the resin was impregnated, was dried at 60° C. for 4 hours or more, thereby manufacturing a composite polymer electrolyte membrane having a final thickness of 5 um.

Thereafter, a membrane electrode assembly and a single cell including the same were manufactured by performing the following processes using the manufactured composite polymer electrolyte membrane.

A 46.5 wt % PC/C catalyst and a Nafion ionomer solution were put into an isopropyl alcohol solvent, and then a catalyst slurry was prepared by mixing the resulting mixture in a ultrasonic mixer for 30 min. The manufactured composite polymer electrolyte membrane was spread and fixed, and then the catalyst slurry was applied directly onto the composite polymer electrolyte membrane by means of a hand spray using a spray gun. At this time, an amount of catalyst loaded on an anode and an amount of catalyst loaded on a cathode were allowed to be 0.2 $mg_{pt}/cm^2$ and 0.4 $mg_{pt}/cm^2$, respectively, and an active area was allowed to be 1 $cm^2$. Accordingly, a membrane electrode assembly (MEA) including an anode electrode and a cathode electrode disposed so as to face each other, and the composite polymer electrolyte membrane interposed therebetween was manufactured.

The manufactured membrane electrode assembly (MEA) was naturally dried until the solvent of the catalyst solution was completely evaporated, and was fastened under a pressure of 70 In*lb by using a gasket and a carbon bipolar plate, thereby manufacturing a single cell.

Comparative Example 1

A membrane electrode assembly (MEA) and a single cell including the same were manufactured by performing the same process as in the Example, except that a Nafion 212 (manufactured by Dupont Inc.) electrolyte membrane having a thickness of 50 um, which was composed of a pure perfluorinated sulfonic acid polymer, was used instead of the composite polymer electrolyte membrane having a thickness of 5 um.

Comparative Example 2

A membrane electrode assembly (MEA) and a single cell including the same were manufactured by performing the same process as in the Example, except that a Nafion 211 (manufactured by Dupont Inc.) electrolyte membrane having a thickness of 25 um, which was composed of a pure perfluorinated sulfonic acid polymer, was used instead of the composite polymer electrolyte membrane having a thickness of 5 um.

Test Example: Evaluation of Micro-Structure of Composite Polymer Electrolyte Membrane In order to evaluate the micro-structure of the composite polymer electrolyte membrane, the surface and cross-section of the composite polymer electrolyte membrane manufactured according to the Example were observed by using a scanning electron microscope (SEM), and an energy dispersive spectrometry (EDS) analysis was performed on the corresponding cross-section. The results are as shown in FIGS. 3 to 5.

Figure 3A:
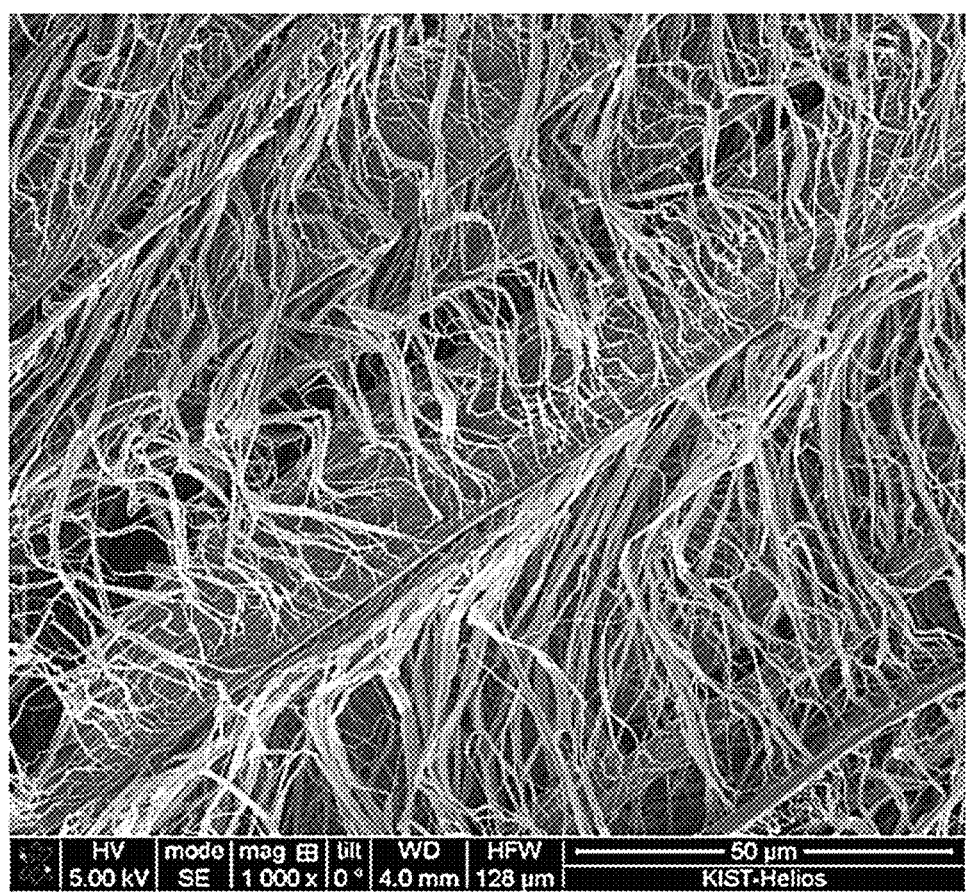
FIGS. 3A and 4A are SEM photographs showing a top surface and a cross-section of a porous fluorinated polymer support before immersion, respectively. Also.
Figure 4A:
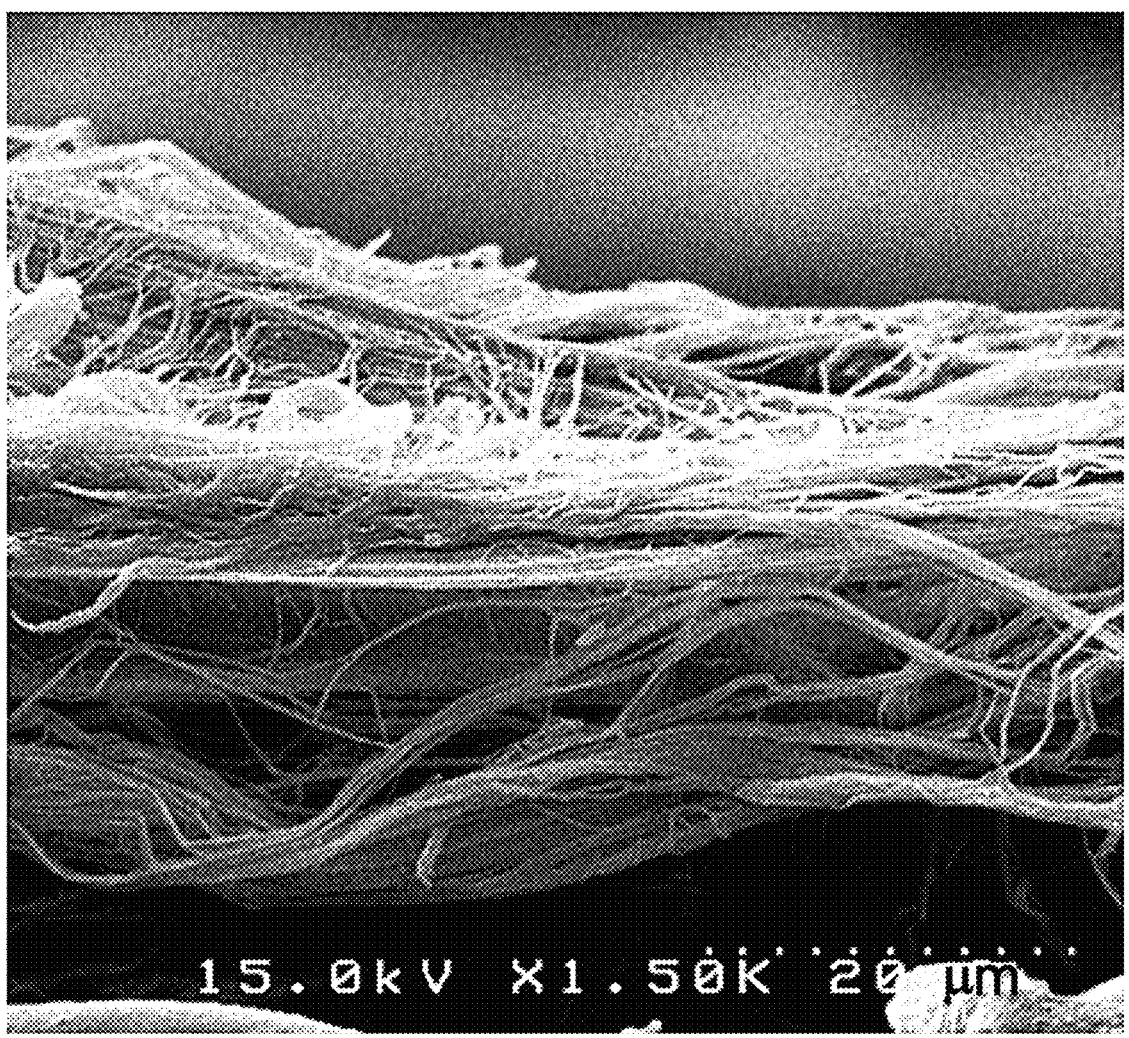

Specifically, FIGS. 3A and 4A are SEM photographs showing a top surface and a cross-section of a porous fluorinated polymer support before immersion, respectively.

Figure 3B:
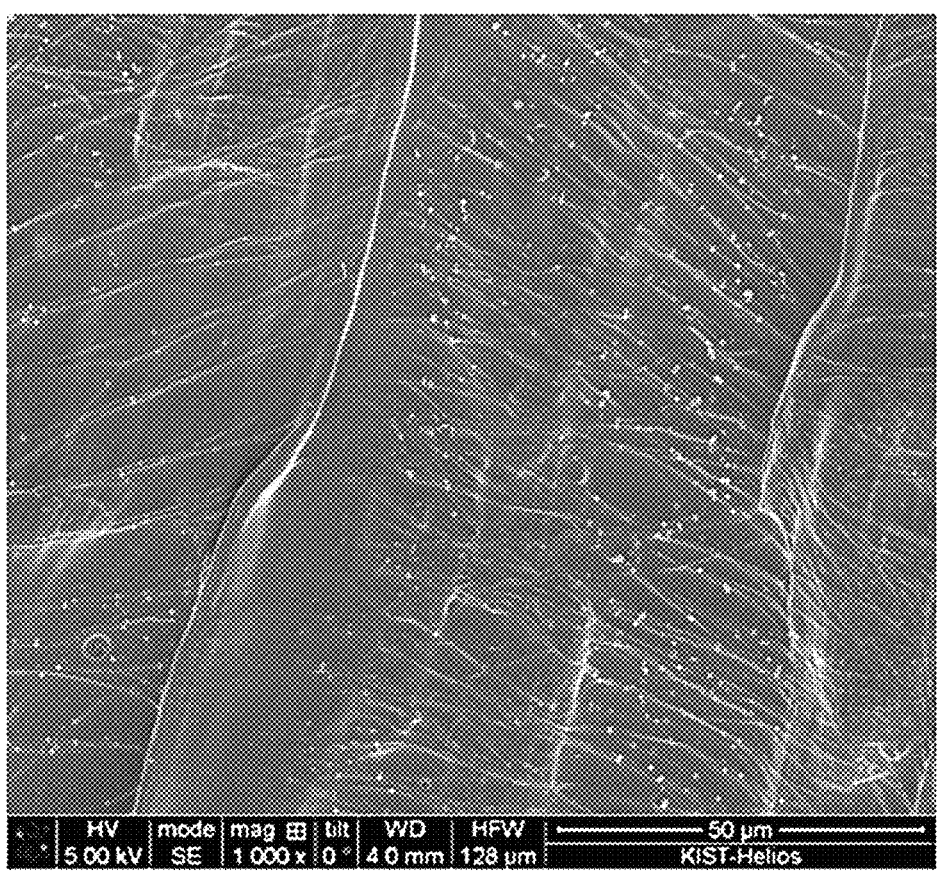
FIGS. 3B and 3C are SEM photographs showing a top surface and a bottom surface of the composite polymer electrolyte membrane manufactured according to the Example, respectively.
Figure 3C:
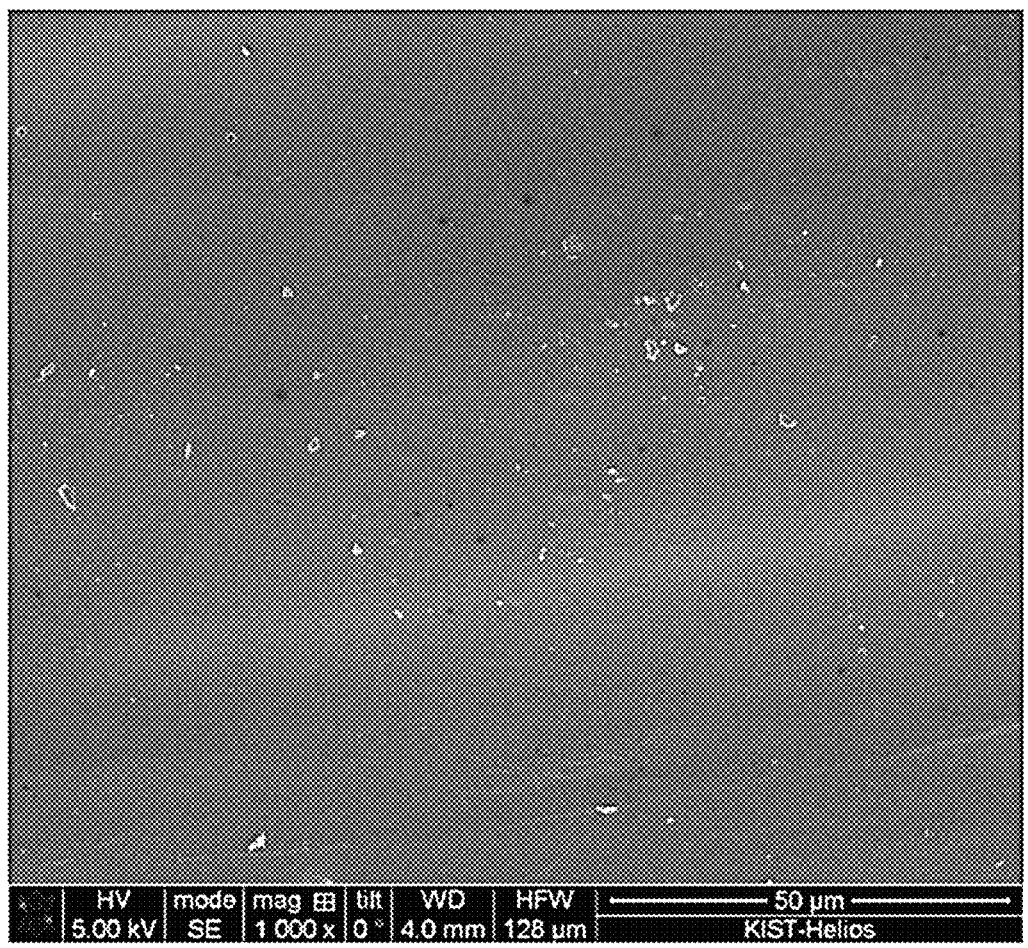
Figure 4B:
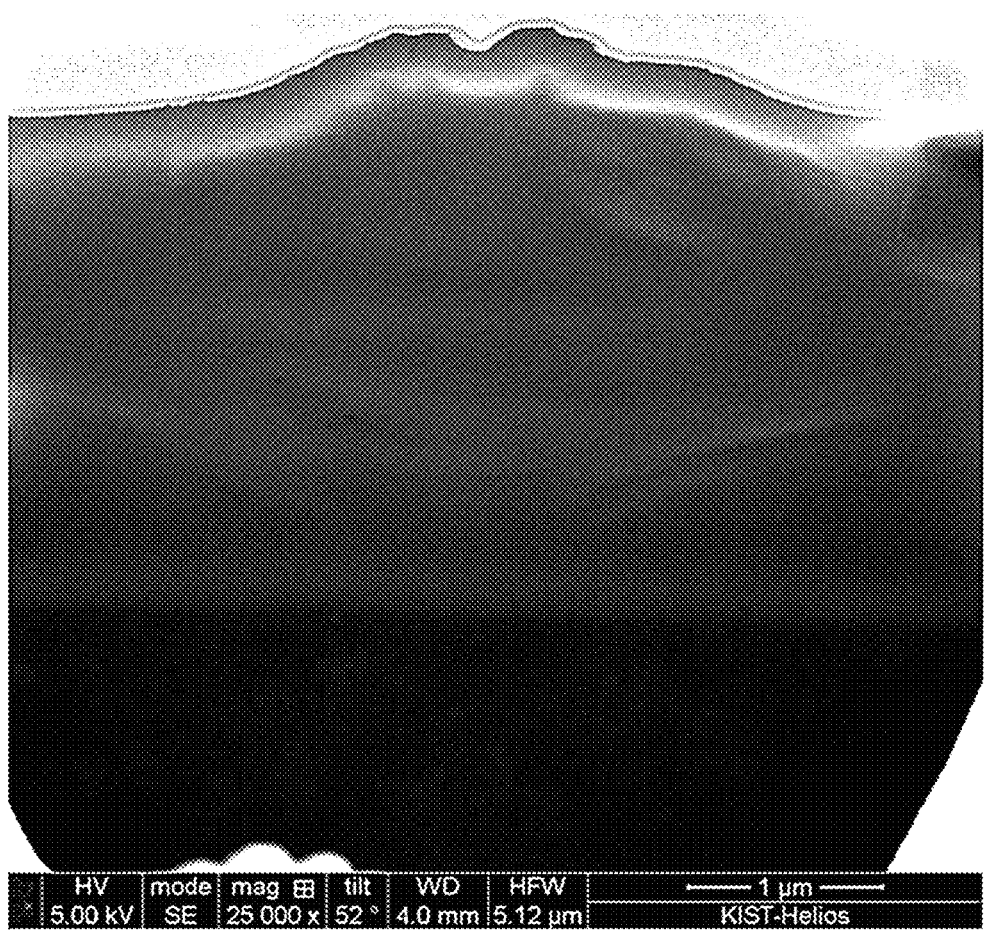
FIG. 4B is a SEM photograph showing a cross-section of the composite polymer electrolyte membrane manufactured according to the Example.
Figure 5A:
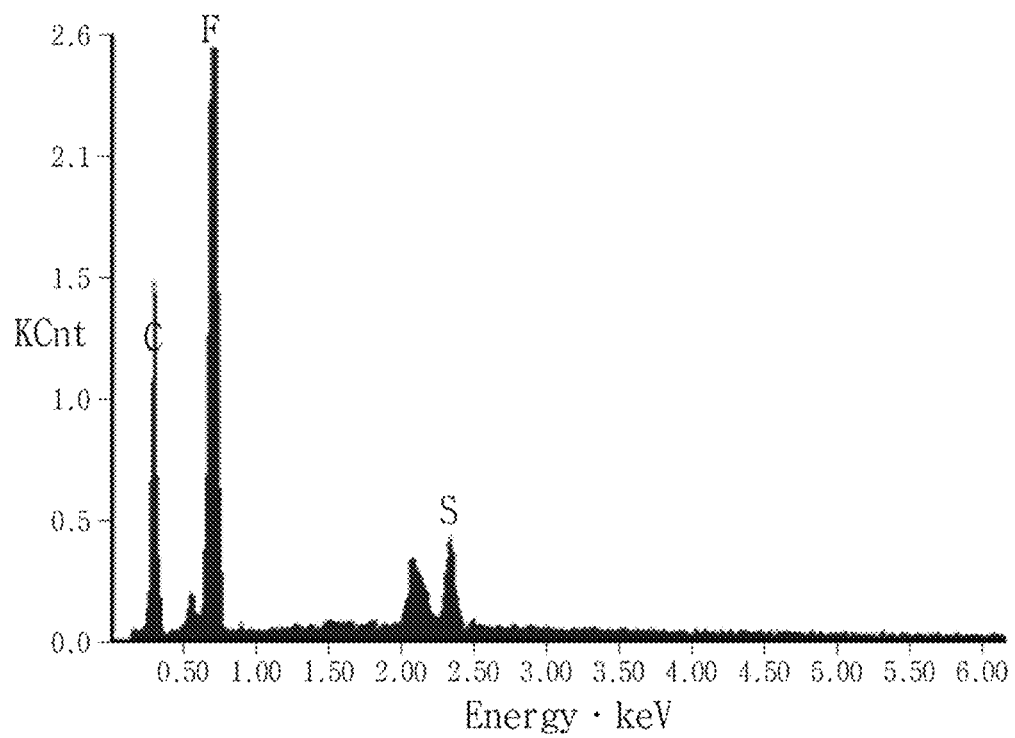
FIGS. 5A to 5C show energy dispersive spectrometry (EDS) analysis results of the cross-section of the composite polymer electrolyte membrane manufactured according to the Example.
Figure 5A:
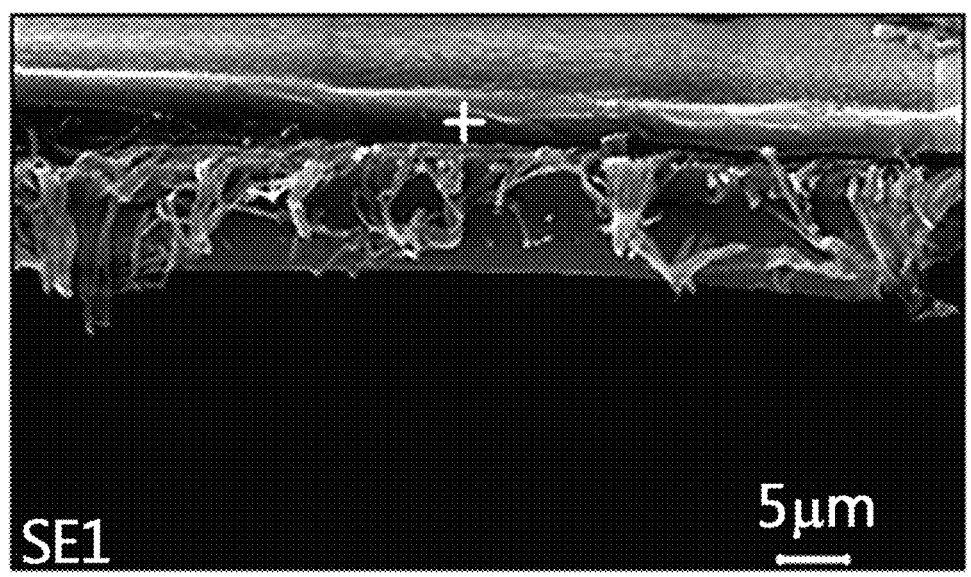
Figure 5B:
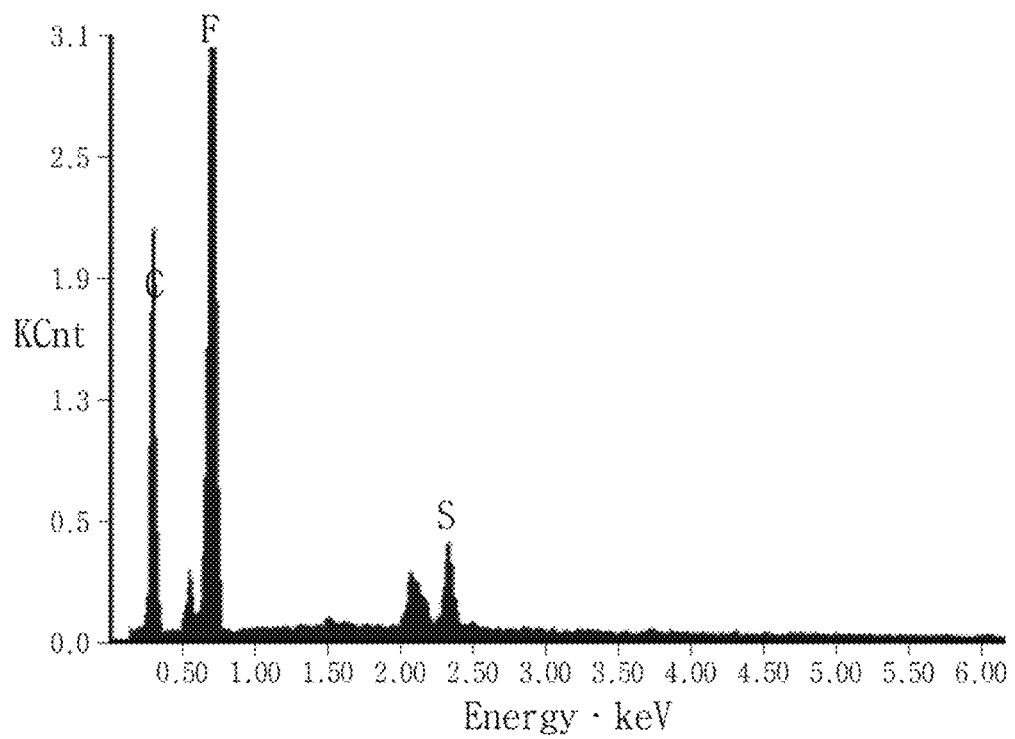
Figure 5B:
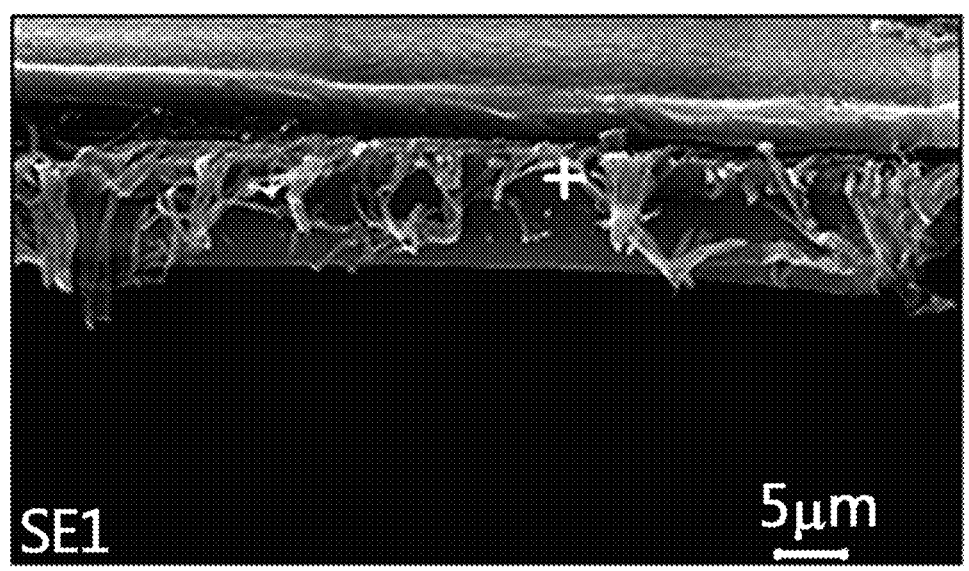
Figure 5C:
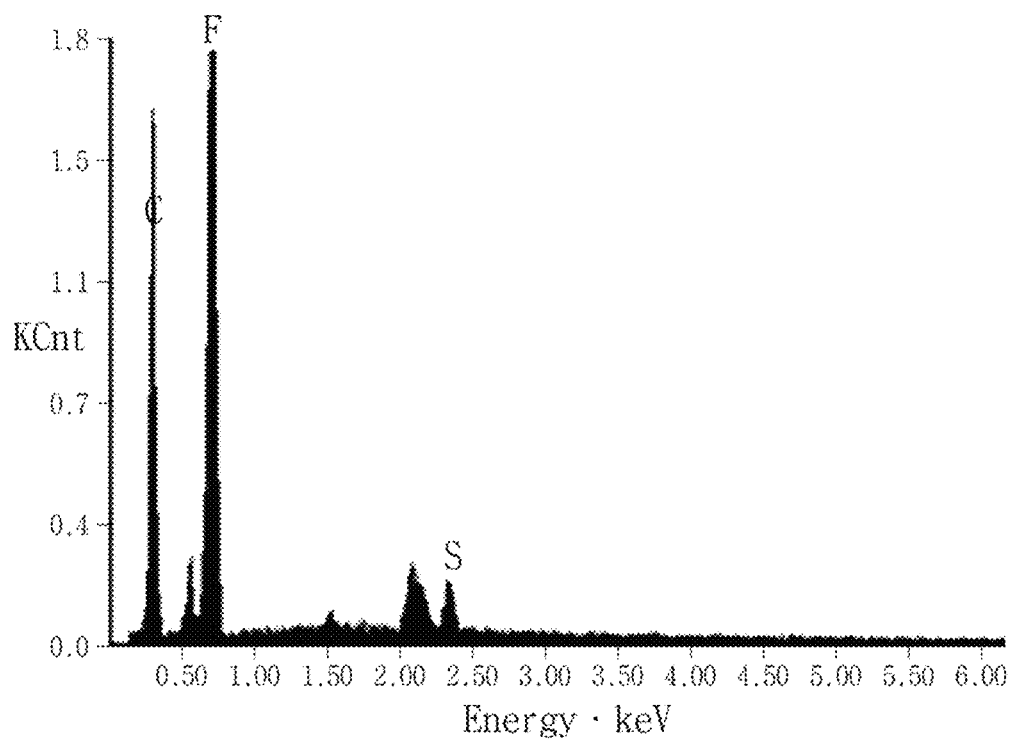
Figure 5C:
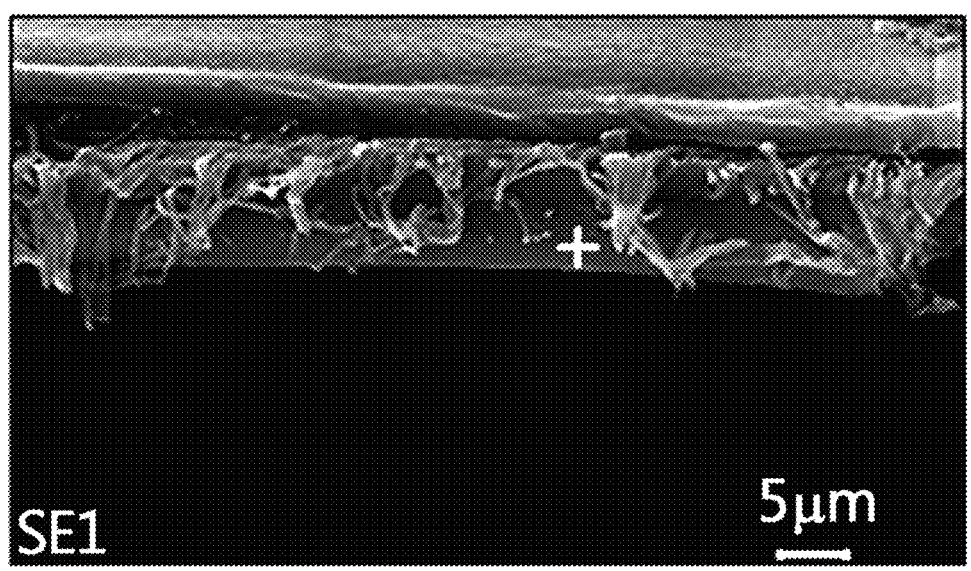

Also, FIGS. 3B and 3C are SEM photographs showing a top surface and a bottom surface of the composite polymer electrolyte membrane manufactured according to the Example, respectively. FIG. 4B is a SEM photograph showing a cross-section of the composite polymer electrolyte membrane manufactured according to the Example. FIGS. 5A to 5C show energy dispersive spectrometry (EDS) analysis results of the cross-section of the composite polymer electrolyte membrane manufactured according to the Example.

Referring to FIGS. 3 and 4, it could be confirmed that the entire region of the polytetrafluoroethylene membrane having a porous structure was filled well with an ion exchange material, and accordingly, a composite polymer electrolyte membrane having a uniform and even structure without any voids and a thickness of 5 um was manufactured.

Further, referring to FIGS. 5A to 5C, it could be confirmed that a Nafion ionomer composed of a polytetrafluoroethylene main chain and side chains having a sulfonic acid group having hydrogen ionic conductivity at ends thereof was evenly impregnated not only on the external surface, but also in the inside of the porous polytetrafluoroethylene membrane.

Through the confirmation, it could be seen that a composite polymer electrolyte membrane having an excellent mechanical strength and an improved dimensional stability while having a minimized thickness could be easily manufactured.

Test Example: Evaluation of Performance of Composite Polymer Electrolyte Membrane In order to evaluate the performance of the composite polymer electrolyte membrane, a current-voltage change was measured by driving a single cell including a single cell including the composite polymer electrolyte membrane manufactured according to the Example and single cells including the pure polymer electrolyte membrane manufactured according to Comparative Examples 1 and 2. At this time, the anode electrode was supplied with hydrogen at a flow rate of 200 cc/min, the cathode electrode was supplied with hydrogen at a flow rate of 600 cc/min, and the current was changed at a rate of 10 mA/s from 0 A to 1.6 A while driving the corresponding single cells under a normal humidified condition of 80° C. The results are as shown in FIG. 6.

Figure 6:
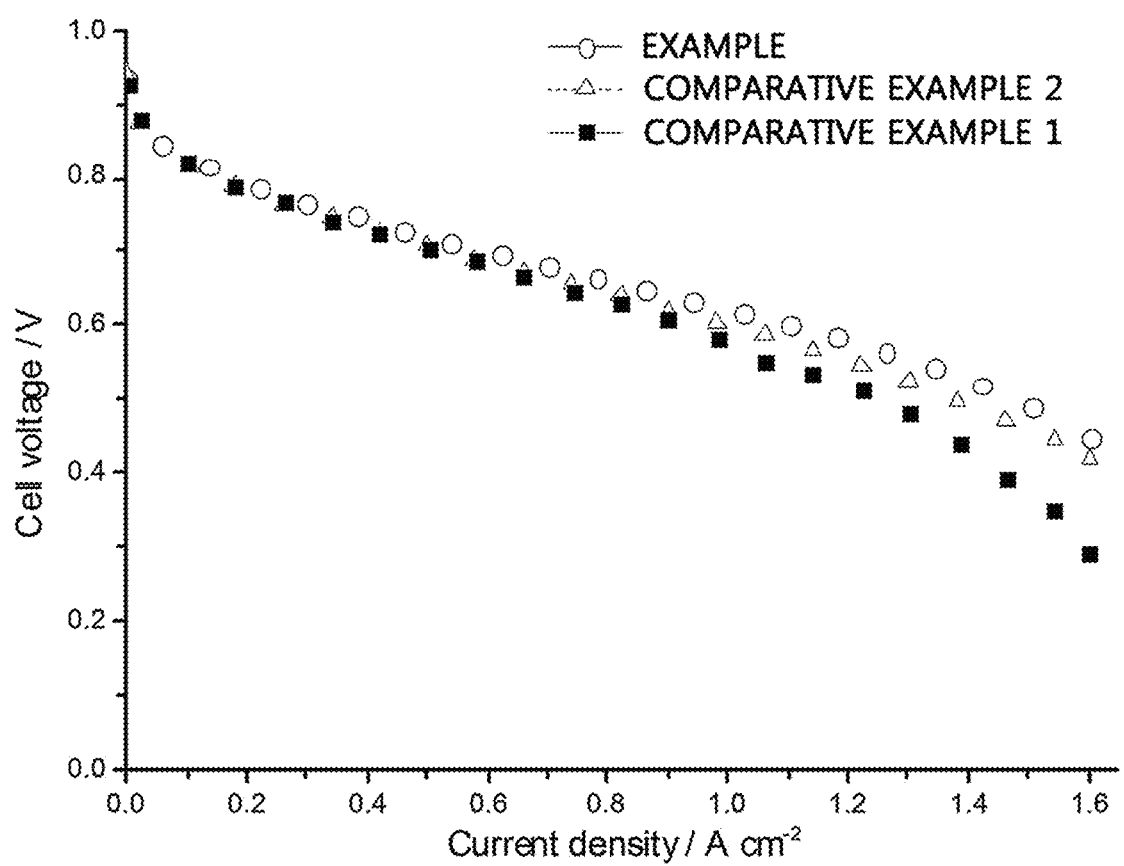
FIG. 6 is a graph comparing and showing the performances of a single cell including the composite polymer electrolyte membrane manufactured according to the Example and single cells including the pure polymer electrolyte membrane manufactured according to Comparative Examples 1 and 2.

Referring to FIG. 6, it could be confirmed that the single cell including the composite polymer electrolyte membrane manufactured according to the Example at a cell voltage of 0.6 V exhibited a performance of 1.092 A/cm$^2$, whereas the single cells including the pure polymer electrolyte membrane manufactured according to Comparative Examples 1 and 2 exhibited a performance of 0.971 A/cm$^2$ and 1.032 A/cm$^2$, respectively. Through the confirmation, it could be seen that it was possible to implement a membrane electrode assembly (MEA) having a much better performance by using the composite polymer electrolyte membrane according to the present disclosure, and a polymer electrolyte fuel cell (PEMFC) including the same.

Further, in order to evaluate the electrochemical characteristics of the composite polymer electrolyte membrane, linear sweep voltammetry (LSV) and cyclic voltammetry (CV) were performed on the single cell including the composite polymer electrolyte membrane manufactured according to the Example and the single cells including the pure polymer electrolyte membrane manufactured according to Comparative Examples 1 and 2. At this time, the anode electrode was supplied with hydrogen, and the cathode electrode was supplied with nitrogen. The results are as shown in FIG. 7.

Figure 7A:
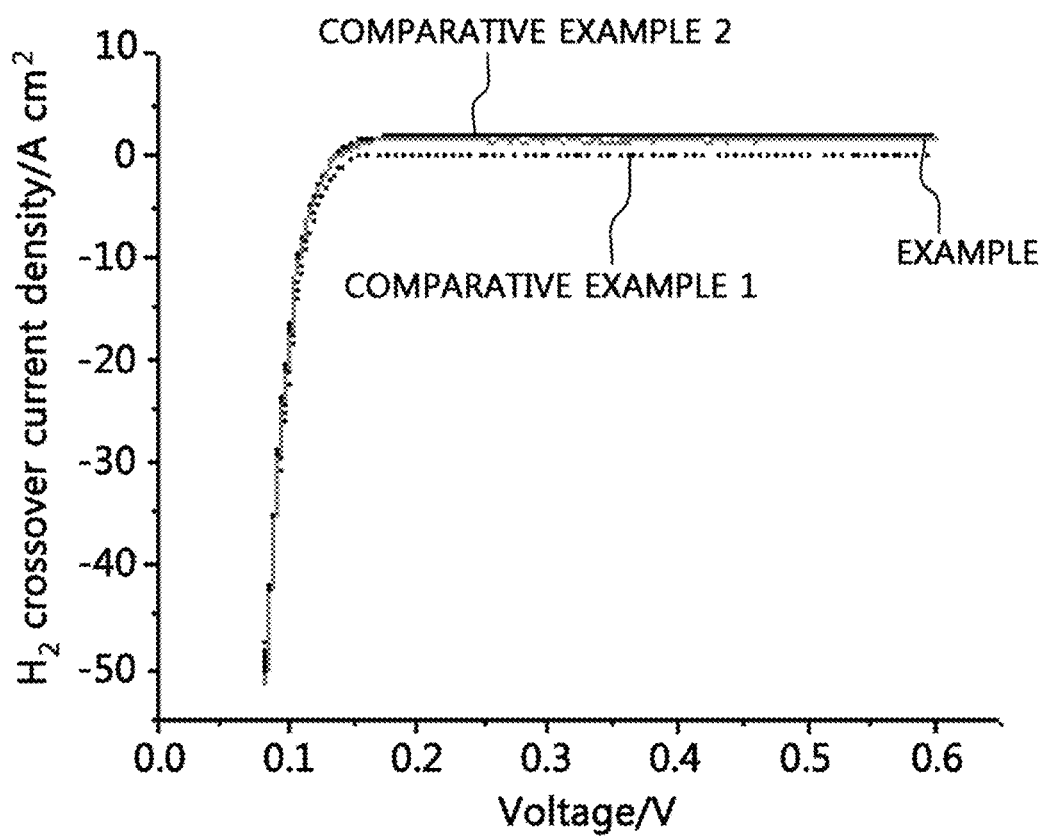
FIG. 7A is a graph comparing and showing $H_2$ crossover current densities of the corresponding single cells measured by using linear sweep voltammetry (LSV)
Figure 7B:
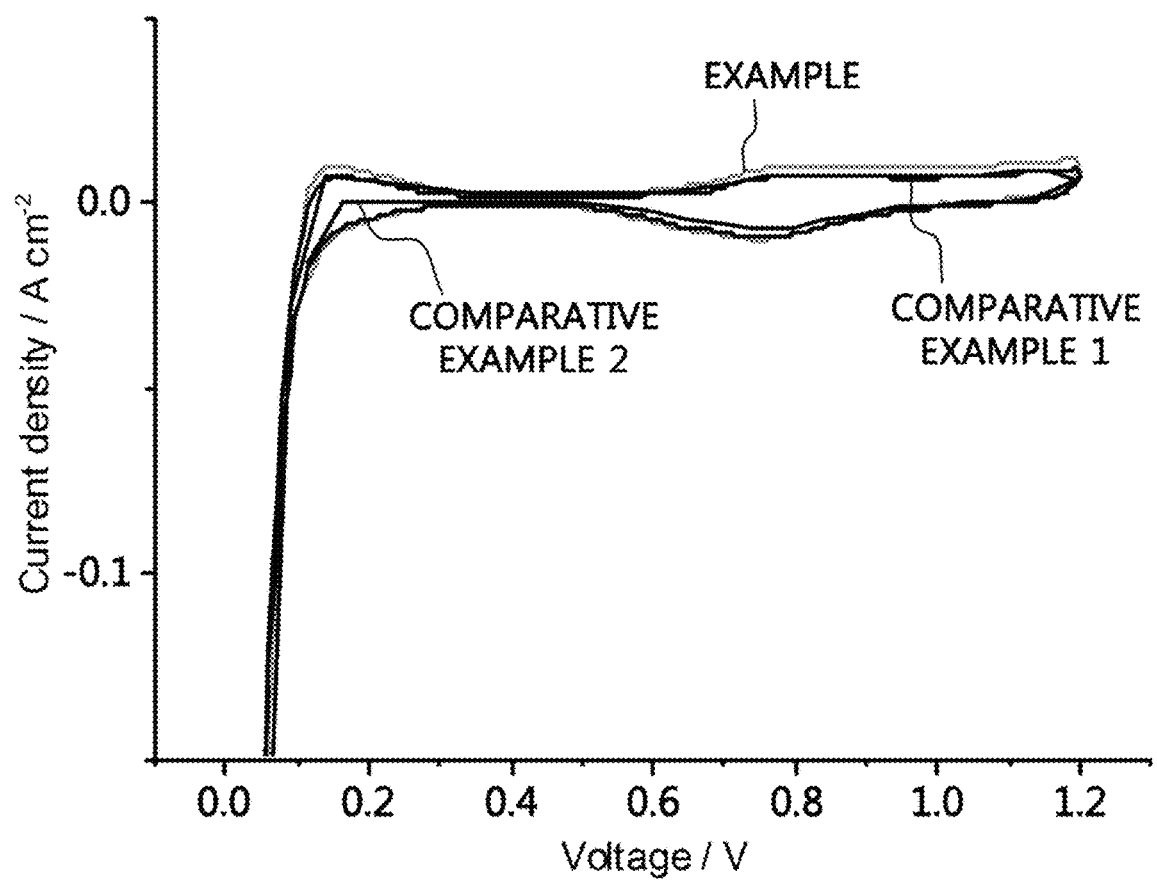
FIG. 7B is a graph comparing and showing electrochemical active areas of the corresponding single cells measured by using cyclic voltammetry (CV).

Specifically, FIG. 7A is a graph comparing and showing H$_2$ crossover current densities of the corresponding single cells measured by using linear sweep voltammetry (LSV), and FIG. 7B is a graph comparing and showing electrochemical active areas of the corresponding single cells measured by using cyclic voltammetry (CV).

Referring to FIG. 7A, it could be confirmed that there was no significant difference in measured H$_2$ crossover current density value between the membrane electrode assembly including the composite polymer electrolyte membrane manufactured according to the Example and the membrane electrode assembly including the pure polymer electrolyte membrane manufactured according to Comparative Example 1 or 2. That is, it could be confirmed that there was a considerable difference in measured values between Nafion 212 having a thickness of 50 um (Comparative Example 1) and Nafion 211 having a thickness of 25 um (Comparative Example 2), whereas the composite polymer electrolyte membrane according to the Example exhibited a value similar to that of Nafion 211 (Comparative Example 2) even though the composite polymer electrolyte membrane had a small thickness of 5 um. In general, considering that the smaller the thickness of the polymer electrolyte membrane is, the higher value of the H$_2$ crossover current density is measured, the result may be interpreted to be because the composite polymer electrolyte membrane according to the Example is manufactured by means of impregnation using centrifugal force, and thus has an increased density.

Furthermore, referring to FIG. 7B, the electrochemically active region of the catalyst could be confirmed by observing an adsorption/desorption reaction occurring between the hydrogen supplied and the platinum electrode of the single cell when the single cell was driven by means of cyclic voltammetry (CV). The corresponding graph confirms the reproducibility by making the measurement at a potential scanning rate of 50 mV/s from 0.05 V to 1.2 V total five times, and then shows the value measured at the fifth time. Through the graph, it could be seen that the single cell according to the Example exhibited a better electrochemical characteristics than those of the single cells according to the Comparative Examples.

EXPLANATION OF REFERENCE NUMERALS AND SYMBOLS

10: Porous fluorinated polymer support
15: Pore of porous fluorinated polymer support
20: Perfluorinated sulfonic acid polymer resin membrane
100: Composite polymer electrolyte membrane

What is claimed is:

1. A method of manufacturing a composite polymer electrolyte membrane for a polymer electrolyte fuel cell, the method comprising:
performing a centrifugal process on a perfluorinated sulfonic acid polymer solution in which a porous fluorinated polymer support is immersed to fill the inside of pores of the porous fluorinated polymer support with a perfluorinated sulfonic acid polymer and form a perfluorinated sulfonic acid polymer resin membrane on an external surface of the porous fluorinated polymer support,
wherein the composite polymer electrolyte membrane comprises:
the porous fluorinated polymer support; and the perfluorinated sulfonic acid polymer resin membrane which fills the inside of pores of the porous fluorinated polymer support and covers an external surface of the porous fluorinated polymer support.

2. The method according to claim 1, wherein the centrifugal process is performed at 300 rpm to 100,000 rpm for 5 min to 60 min.

3. The method according to claim 1, before performing the centrifugal process, further comprising treating the porous fluorinated polymer support with acetone, methanol, ethanol, propanol, or hydrogen peroxide.

* * * * *